3,343,511
HYDRAULIC MERCURY TRANSFER SYSTEM
Ray F. Hinton, Davidsonville, and Roland W. Robbins, Jr., Arnold, Md., assignors to the United States of America as represented by the Secretary of the Navy
Filed June 13, 1966, Ser. No. 557,870
2 Claims. (Cl. 114—16)

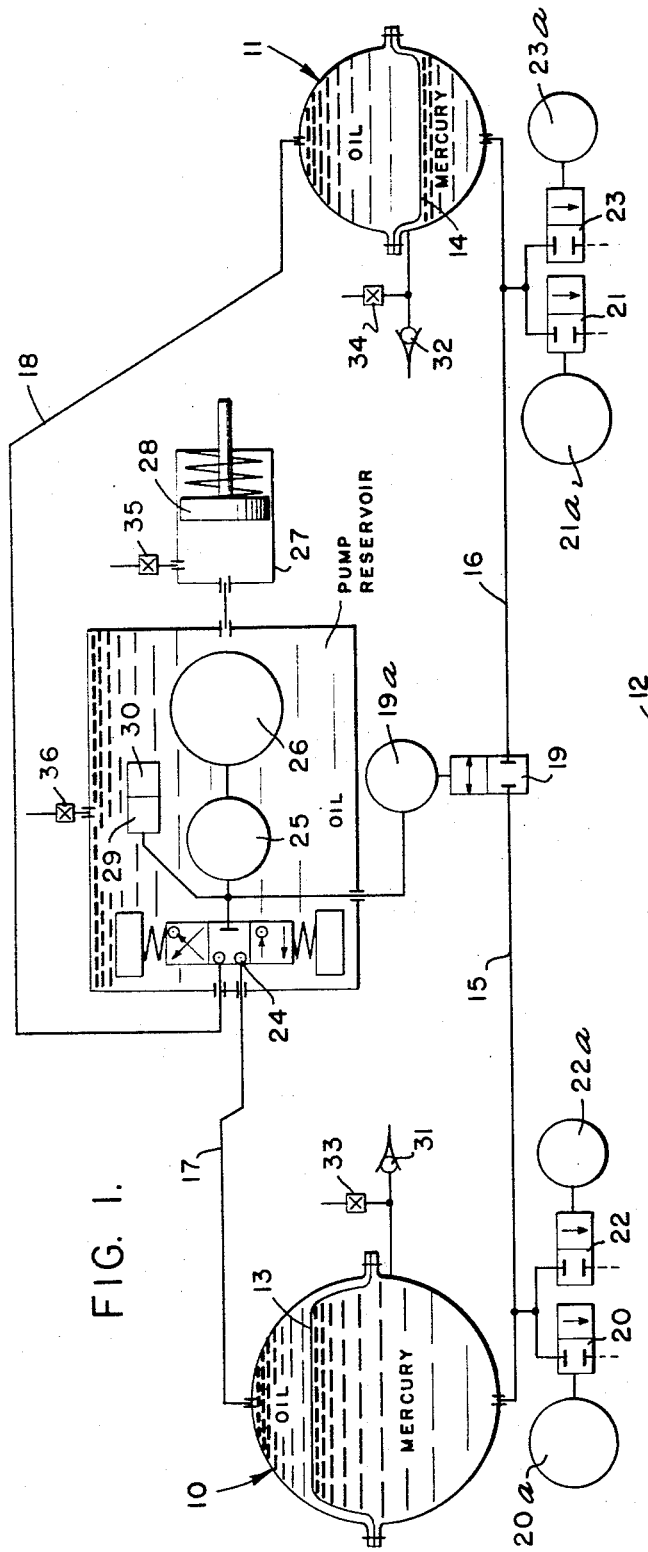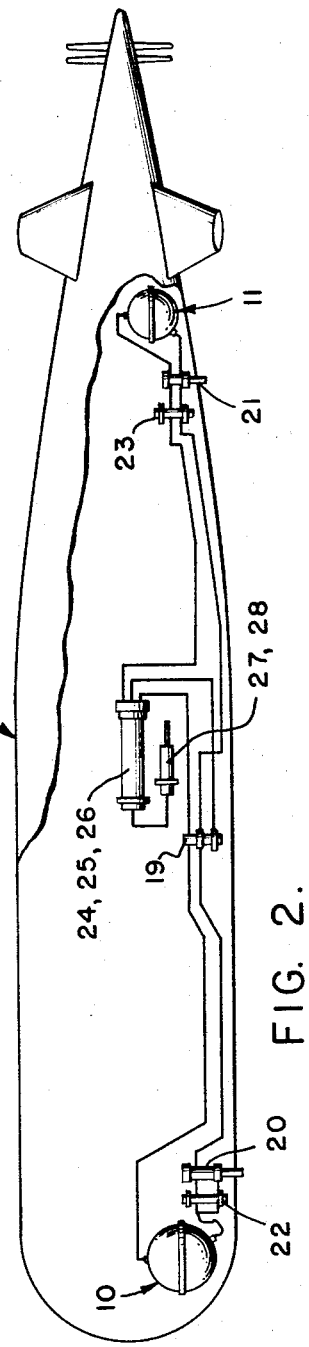
INVENTORS.
RAY F. HINTON
ROLAND W. ROBBINS, JR.
BY
JOHN M. KOCH
ROY MILLER
ATTORNEYS.

ABSTRACT OF THE DISCLOSURE

This invention relates to a hydraulic system for transferring liquid mercury from one zone to another, particularly for use in stabilizing or balancing a vehicle, and especially for providing static ballast to control buoyancy and to provide static pitch trim capability in a water-borne vehicle.

---

The invention described herein may be manufactured and used by or for the Government of the United States of America for governmental purposes without the payment of any royalties thereon or therefor.

In submerisible vehicles, for example, it often is necessary to provide rapid forward pitch unbalance and speedy recovery to quickly break the surface for making a sudden dive. This is accomplished by rapidly transferring ballast fore and then again aft. For safety reasons, it also is desirable that the submersible vehicle be provided with a speedy jettison capability to provide emergency buoyancy.

Accordingly, it is a principal object of the invention to provide a safe and efficient system for producing both a longitudinal trim capability and an emergency buoyancy capability upon a vehicle, such as a water-borne or airborne vehicle or space craft.

Another object of this invention is to provide a hydraulic system for rapidly and conveniently transferring liquid mercury from one zone to another.

A further object of the invention is to provide a safe, compact and speedy hydraulic system for transferring liquid mercury ballast fore and aft in a submersible vehicle and for rapidly jettisoning mercury for emergency buoyancy purposes.

Additional objects of the invention will become apparent from the following description, which is given primarily for purposes of illustration, and not limitation.

Stated in general terms, the objects of the invention are attained by providing a hydraulic system for transferring liquid mercury, such as from one container to another, by providing each container with an elastic partition, or diaphragm to partition a body of hydraulic oil from a body of liquid mercury in each container, interconnecting the oil and interconnecting the mercury, respectively, in each container by conduits and incorporating a rapid response hydraulic pumping system in the hydraulic oil interconnecting conduit. Mercury jettison valves, both automatic and manually controlled, preferably also are included in the mercury transfer system together with auxiliary valves and maintenance, control and safety means.

A more detailed description of a specific embodiment of the invention is given below with reference to the accompanying drawings, wherein:

FIG. 1 is a schematic diagram showing a hydraulic mercury transfer system of the invention for use on a submersible vehicle; and FIG. 2 is a schematic elevational view showing the mercury transfer system of FIG. 1 installed in a submersible vehicle.

The system includes two spherical pressure vessels 10 and 11; vessel 10 being located in a forward position and vessel 11 in a rearward position inside submersible vehicle 12. Each pressure vessel is constructed of top and bottom hemispherical portions bolted together, as shown in FIG. 2, and horizontally partitioned into an upper half and a lower half by a resilient diaphragm 13 in vessel 10, and 14 in vessel 11, as shown in FIG. 1. Initially, the lower half of each pressure vessel 10 and 11 is filled with liquid mercury and the upper halves are filled with hydraulic oil.

The lower halves of pressure vessels 10 and 11 are interconnected by a mercury transfer line 15, 16 and the upper halves of the pressure vessels are interconnected by a hydraulic oil transfer line 17, 18. A hydraulically operated mercury line valve 19, indicated at 19(a) to be actuated by hydraulic pressure, is connected into mercury transfer line 15, 16 to prevent the flow of mercury in the transfer line at times other than during periods of hydraulic pumping action, when a transfer flow of mercury is desired.

Each portion 15 and 16 of the mercury transfer line is provided, as shown in FIG. 1, with an automatic, pressure actuated, mercury jettison valve 20 and 21, respectively, to automatically jettison mercury in the event that the maximum operational depth is exceeded. Automatic pressure actuation means are indicated at 20(a) and 21(a), respectively. Portions 15, and 16 of the mercury transfer line also are provided, respectively, with a manually controlled, electric motor driven, as indicated at 22(a) and 23(a), ball type mercury jettison valve 22 and 23, to give the operator jettison control. The redundancy in this area is designed to incorporate desired safety features into the mercury transfer system.

A four-way flow direction control valve 24 is connected in the hydraulic oil line 17, 18 to direct the flow of hydraulic oil, in one of two directions, between a positive displacement pump 25, driven by an electric motor 26, the two pressure vessels 10 and 11 and a hydraulic oil reservoir 27. Four-way valve 24 is a solenoid valve, as indicated. Hydraulic oil reservoir 27 also serves as a system pressure equalizer with ambient and overpressure for the pump 25 inlet, and serves, in addition, as a fluid make-up device provided with spring-loaded piston 28.

A pressure relief valve 29 is connected to pump 25 to relieve the pump when either pressure vessel 10 or 11 is full, indicating a completed mercury transfer condition. This condition is indicated to the operator by a pressure switch relief indicator 30 connected to relief valve 29. Valve 24, pump 25, reservoir and fluid make-up 27, 28, relief valve 29 and switch 30 can be mounted in a hydraulic power package, as indicated in FIG. 2, also serving as a pump reservoir.

Two seawater inlet type check valves 31 and 32 are connected to the mercury portion of pressure vessels 10 and 11, respectively, to expedite the flow of mercury during a mercury jettisoning operation, by permitting seawater to displace mercury from the two pressure vessels. Four air bleed valves 33, 34, 35 and 36 are connected, respectively, as shown in FIG. 1 to pressure vessels 10 and 11, reservoir 27 and a high point in the hydraulic system.

In operation, the transfer of mercury to provide rapid forward pitch, for example, as is desired in quickly making a dive, is accompilshed by pumping hydraulic oil into the upper portion of pressure vessel 11, as indicated in FIG. 1. The increase in hydraulic pressure opens hydraulically operated mercury line valve 19, and the pumping of oil into vessel 11 causes resilient diaphragm 14 to expand against the mercury. This action forces mercury out through the bottom port of vessel 11 through mercury line valve 19 and interconnecting mercury transer line 15, 16 into the bottom of pressure vessel 10. A corresponding volume of hydraulic oil is displaced from the top of vessel 10, toward pump 25 and vessel 11, as the mercury in vessel 10 expands diaphragm 13.

Thus rapid forward pitch unbalance, corresponding to the difference in weight between the mercury and the hydraulic oil transferred fore and aft, respectively, is produced in submersible vehicle 12, and it rapidly enters into a dive. After the dive is completed, rapid recovery of submersible vehicle 12 is achieved by adjusting four-way valve 24 to reverse direction flow, and transferring mercury from vessel 10 to vessel 11 and hydraulic oil from vessel 11 to vessel 10 to restore the original balanced condition before the dive. After pump 25 is shut off, mercury line valve 19 again closes, and mercury transfer ceases.

Should submersible vehicle 12 dive too deeply, or for some other reason exceed its maximum operational depth, automatic jettison valves 20 and 21, which are pressure actuated, automatically jettison mercury to decrease the ballast and thus avoid descent into depths beyond the predetermined operational depth. In the event the operator desires to jettison mercury, under controlled conditions, he may do so by means of electric motor driven jettison ball valves 22 and 23. Seawater inlet type check valves 31 and 32 can be brought into play, if desired, to speed up the jettison rate by using the seawater pressure to increase the flow rate of the mercury being jettisoned.

It will be observed that, with the exception of the two electric jettison valves 22 and 23, the entire system is depth insensitive. This feature is accomplished by the inclusion of the spring loaded piston-reservoir and make-up unit 27, 28 in the system. All depth limitations can be removed from the system, if desired, by also making the electric jettison valves depth insensitive, such as by filling them with hydraulic oil and pressure equalizing them.

In place of the four-way valve 24, which is used to direct oil flow in one of two directions, a reversible motor attached to a reversible flow pump could be used to achieve the same results.

Also, instead of hydraulic oil, other suitable fluids can be used. Alcohols, glycols, kerosene or any other low freezing, high boiling, low viscosity, suitable liquid can be used instead of hydraulic oils. Furthermore, suitable gases, under pressure, can be used instead of the hydraulic oil, or other liquid, to apply pressure upon the mercury and cause it to move from one pressure vessel to another. Compression of the gases could be achieved by the use of a gas compressor or by the use of high pressure bottle gas.

While there have been shown and described and pointed out the fundamental novel features of the hydraulic mercury transfer system of the invention as applied to a preferred embodiment, it will be understood that various omissions and substitutions and changes in the form and details of the mercury transfer system illustrated and in its operation may be made by those skilled in the art without departing from the spirit of the invention. It is the intention, therefore, to be limited only as indicated by the scope of the following claims:

What is claimed is:
1. A mercury transfer system which comprises:
 (a) a pair of container means;
 (b) a movable partition means mounted in each of the container means;
 (c) a body of liquid mercury disposed in each of the container means and on one side of the partition thereof;
 (d) a body of a second fluid disposed in each of the container means on the other side of the partition thereof;
 (e) a first conduit means establishing communication between the container means and the bodies of liquid mercury therein;
 (f) a second conduit means establishing communication between the container means and the bodies of said second fluid therein;
 (g) and means for forcibly transferring some of said second fluid from a first one of said container means to the second container means for displacing some of the mercury from the second container means to the first container means;
 (h) each of said container means being provided with mercury jettison means adapted both for automatic and manual jettison control.

2. A mercury transfer system according to claim 1, wherein said second fluid is hydraulic oil, said means for forcibly transferring some of said second fluid includes hydraulic pump means, hydraulic oil flow control means and hydraulic pressure actuated mercury transfer valve control means.

References Cited

UNITED STATES PATENTS 1,399,263 12/1921 Lantz _____ 114—16
2,963,245 12/1960 Bolton _____ 114—125

FOREIGN PATENTS 78,157 9/1954 Denmark.

MILTON BUCHLER, *Primary Examiner.*

T. M. BLIX, *Assistant Examiner.*